(12) United States Patent
Cogliati

(10) Patent No.: US 8,863,386 B2
(45) Date of Patent: Oct. 21, 2014

(54) SUPPORT STRUCTURE FOR SOLAR PLANTS AND METHOD FOR MOUNTING

(75) Inventor: Domenico Paolo Maria Cogliati, Monza (IT)

(73) Assignee: Vetraria Biancadese di Lucatello & C. SAS, Roncade (IT)

( * ) Notice: Subject to any disclaimer, the term of this patent is extended or adjusted under 35 U.S.C. 154(b) by 494 days.

(21) Appl. No.: 13/376,769

(22) PCT Filed: Jun. 9, 2010

(86) PCT No.: PCT/IB2010/001394
§ 371 (c)(1),
(2), (4) Date: Dec. 7, 2011

(87) PCT Pub. No.: WO2010/143050
PCT Pub. Date: Dec. 16, 2010

(65) Prior Publication Data
US 2012/0081806 A1   Apr. 5, 2012

(30) Foreign Application Priority Data
Jun. 9, 2009   (IT) .............................. UD2009A0115

(51) Int. Cl.
*B23P 15/26* (2006.01)
*F24J 2/12* (2006.01)
*F24J 2/14* (2006.01)
*F24J 2/52* (2006.01)

(52) U.S. Cl.
CPC *F24J 2/145* (2013.01); *Y02E 10/47* (2013.01); *Y02E 10/45* (2013.01); *F24J 2002/5284* (2013.01); *F24J 2/5258* (2013.01)
USPC ................... 29/890.033; 29/525.01; 126/694; 126/696; 248/154

(58) Field of Classification Search
CPC ...... F24J 2/52; F24J 2002/4658; Y02E 10/47; Y02E 10/11
USPC ........ 29/890.033, 525.01; 126/684, 692, 694, 126/696; 248/154, 176.1, 187.1, 226.11, 248/227.1, 231.71, 316.1; 52/222; 403/329
See application file for complete search history.

(56) References Cited

U.S. PATENT DOCUMENTS 4,139,270 A   2/1979  Dotson
4,268,332 A   5/1981  Winders
(Continued)

FOREIGN PATENT DOCUMENTS

| DE | 20318080 | 4/2005 |
| EP | 0136044 | 4/1985 |
| WO | 2009/095433 | 8/2009 |

*Primary Examiner* — Sarang Afzali
(74) *Attorney, Agent, or Firm* — Hamre, Schumann, Mueller & Larson, P.C.

(57) ABSTRACT

Support structure, comprising a supporting wall, advantageously with a substantially parabolic profile or suchlike, for solar plants of the concentration type, and able to support at least a thin and flexible reflection plate, able to reflect the sun's rays in order to concentrate them in correspondence with collectors to exploit the solar energy. The support structure comprises clamping elements movable with respect to the supporting wall, and able to clamp the reflection plate in cooperation with the supporting wall. The support structure comprises adjustment means constrained to the clamping elements and able to cooperate with relative elastic means constrained to the supporting wall. The elastic means are disposed and conformed with respect to the supporting wall so as to exert an action of traction on the adjustment means and on the clamping elements, so as to exert the desired action of deformation on the reflection plate.

8 Claims, 3 Drawing Sheets

(56) References Cited

U.S. PATENT DOCUMENTS

| | | |
|---|---|---|
| 4,317,444 A | 3/1982 | Maruko |
| 4,358,183 A * | 11/1982 | Whiteford .................... 359/847 |
| 2011/0162639 A1 * | 7/2011 | Jeandeaud .................... 126/634 |
| 2011/0272372 A1 * | 11/2011 | Peter et al. .................... 211/124 |
| 2012/0298817 A1 * | 11/2012 | West et al. ............... 248/220.22 |

* cited by examiner

SUPPORT STRUCTURE FOR SOLAR PLANTS AND METHOD FOR MOUNTING

FIELD OF THE INVENTION

The present invention concerns a support structure for solar plants. In particular the support structure according to the present invention is used in concentration type solar plants to support a plurality of reflection plates suitable to concentrate the sun's rays in suitable collectors, in order to exploit the solar energy.

BACKGROUND OF THE INVENTION

In solar plants of the concentration type, it is known to use curved support structures to support a plurality of reflection plates made of glass or other suitable material, thin and flexible, able to reflect the sun's rays to concentrate them in suitable collectors, advantageously present on the structure, so as to exploit the solar energy.

The reflection plates are associated, either flat or curved in advance, with the support structure by means of clamping elements provided in at least one of the two opposite edges of the support structure and able to clamp the reflection plates on the structure and to conform them according to a desired parabolic shape.

The clamping elements comprise mobile means, such as a structural shape associated with the edges of the structure, able to be moved from a first position, in which the reflection plates, originally substantially flat, are associated with the support structure, to a second position, in which the mobile means deform the flat reflection plates, exerting compression forces on the opposite edges of each plate.

In this way, the plates are deformed to conform them to the curve of the profile defined by the support structure.

This allows to clamp the reflection plates in the deformed position with the support structure, or vice versa, to remove the plates from the structure.

One disadvantage of known support structures is that the current clamping means provide complex combinations of screws, springs, levers or other which, apart from making the operations to install/remove the reflection plates long and expensive, also have relatively high production costs, and problems with maintenance over time.

Moreover, known clamping means are difficult to adjust in order to vary the degree of deformation of the plate and, in any case, they do not allow an accurate adjustment due to the plays of assembly and possible deformations in size also due to variations in temperature.

Known support structures are described in documents U.S. Pat. No. 4,139,270 and DE-U-20318080.

One purpose of the present invention is to achieve a support structure for solar plants that will allow a simple and rapid installation and optimum attachment of the reflection plates, and which also allows simple and rapid operations to maintain and replace them.

Another purpose is to allow accurate adjustments, also after assembly, to improve and/modify the capacity of concentrating the radiant energy.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a support structure according to the present invention, having a supporting wall with a profile advantageously of the parabolic type or similar, and predefined, is able to be used in solar plants of the concentration type in order to support at least a reflection plate, thin and flexible, suitably conformed as a parabola.

The support structure comprises clamping elements, mobile with respect to the supporting wall, and able to clamp the reflection plate in the desired position and also until the plate rests on the wall.

According to a characteristic feature of the present invention, the support structure comprises adjustment means, constrained to the clamping elements, and able to cooperate with elastic means constrained to the supporting wall of the support structure.

The elastic means are disposed and conformed with respect to the supporting wall, so as to exert traction on the adjustment means and therefore on the clamping elements so that the latter exert an action, of the desired and controlled degree, of deformation on the reflection plate, deforming it so as to clamp it in the deformed position.

In this way, the action of the elastic means in traction on the adjustment means determines a greater accuracy and safety in clamping the reflection plate, allowing to recover, in an optimized manner, possible plays in assembly, to distribute the traction on the edges of the plates and to compensate possible variations in size of the reflection plate, caused by heat variations, variations in size and variations caused by wear.

The present invention therefore guarantees, simply and economically, that the intensity of the clamping action is accurately adjusted, and that the adjustment position reached is maintained.

According to the present invention, the adjustment means comprise at least adjustment screws cooperating with the elastic means, which comprise a leaf spring elastic element.

According to a variant, the leaf spring elastic element comprises opposite support ends with respect to the adjustment means, able to cooperate with an internal portion of the supporting wall.

According to a variant, the clamping elements and the adjustment means are made in a single body.

According to another variant, the adjustment means and the elastic means are made in a single body.

According to another variant, the clamping elements, the adjustment means and the elastic means are made in a single body.

According to another variant of the present invention the seat where the elastic means operate cooperates with means that condition the widening of the elastic means, and allow them to stiffen.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
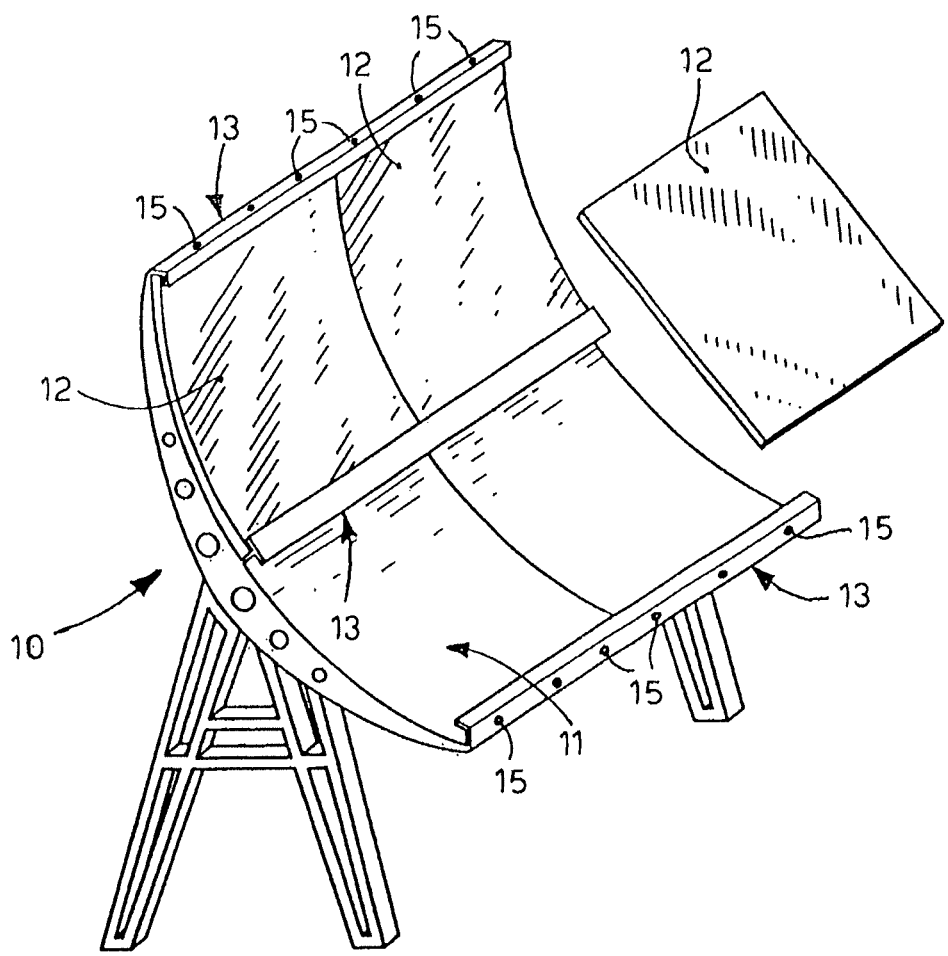
FIG. 1 is a three-dimensional view of a support structure according to the present invention.
Figure 2:
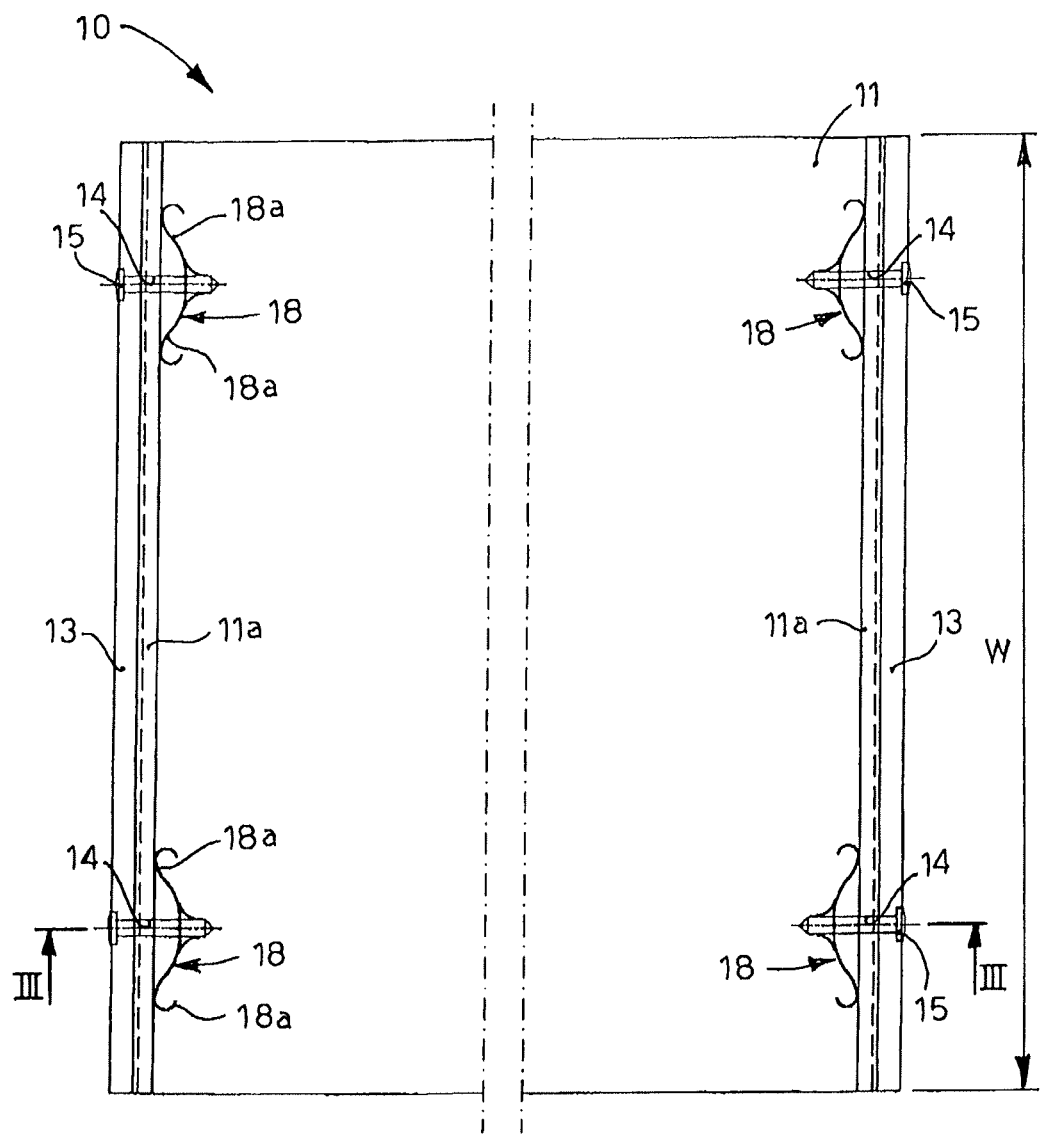
FIG. 2 is a view from below of a detail of the support structure in FIG. 1.
Figure 3:
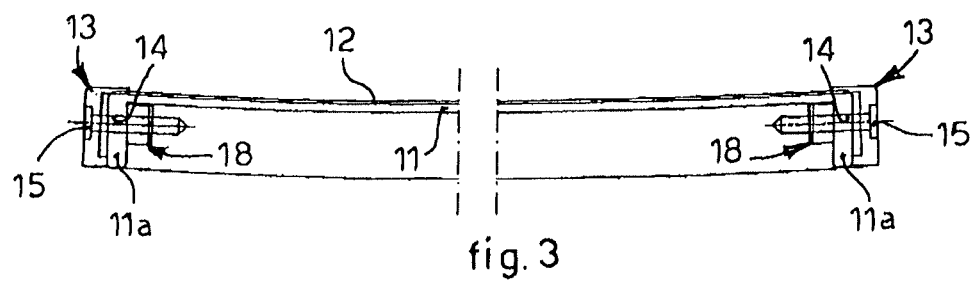
FIG. 3 is a section from III to III in FIG. 2.

With reference to the attached drawings, a variably configured support structure 10 is able to be used in solar plants of the concentration type, and comprises a supporting wall 11, able to support one or more reflection plates 12, thin and flexible, suitable to reflect the sun's rays and concentrate them in correspondence with collectors to exploit the solar energy, present on the support structure 10 and not shown in the drawings.

The supporting wall 11 is shaped so as to define a substantially parabolic and desired profile and is associated along two of its opposite edges with clamping elements 13, mobile with respect to the supporting wall 11 and functioning as retainers. In this case the clamping elements 13 are conformed as structural shapes, substantially C-shaped.

The clamping elements 13 are suitable to clamp the plates 12 in relation to the support structure 10 until they are conformed according to the parabolic profile of the supporting wall 11.

Advantageously, the supporting wall 11 is provided, in correspondence with the clamping elements 13, with opposite lateral edges 11a, substantially L-shaped, which develop at least partly along its width W. The lateral edges 11a can also be conformed differently, for example C- or V-shaped.

The lateral edges 11a are suitable to cooperate with internal portions of the clamping elements 13 during the attachment of the plate 12 to the supporting wall 11.

In fact, both the edges 11a and the clamping elements 13 are provided with through holes, coaxial with respect to each other, and distributed in a regular manner along the width W, so as to define a single through seating 14 into which corresponding adjustment screws 15 are inserted.

Each screw 15 is constrained axially to the relative clamping element 13, is disposed through through the lateral edge 11a of the supporting wall 11 and protrudes toward the inside of the latter with a threaded portion.

The protruding threaded portion of each screw 15 is suitable to cooperate, by screwing, with a corresponding elastic element 18, having a leaf spring conformation, disposed directly on an internal portion of the edge 11a of the supporting wall 11.

The positioning of the elastic element 18 determines a traction toward the inside of the screws 15 which, as they are axially constrained to the clamping element 13, also determine a traction of the latter toward the inside of the supporting wall 11.

Consequently, since the clamping element 13 is in cooperation with the plate 12, the latter is compressed until it reaches the deformed position close to the supporting wall 11, so as to conform it substantially to the parabolic curve.

Furthermore, the elastic traction exerted by the elastic element 18 on the screw 15 also functions as a check nut for the screw 15.

In this case, the elastic element 18 is provided with opposite support ends 18a able to cooperate with the internal portion of the edge 11a of the supporting wall 11, so as to contribute to the distribution of the traction exerted on the corresponding screw 15. Indeed, each end 18a has a sliding portion 19, disposed at the lower part, and suitable to allow the ends 18a to slide on the edge 11a as the screw 15 is gradually screwed in and an elastic clamping portion 20, disposed laterally in each end 18a, to exert a stopping action of the elastic action.

The elastic elements 18 are also suitable to recover possible plays in assembly of the plate 12 during the installation step, and to compensate for possible variations in size of the plate 12.

The screws 15, together with the elastic elements 18, thus have the function of clamping each plate 12 to the supporting wall 11, at the same time exerting traction on the clamping elements 13.

Moreover, by means of the screws 15 it is possible to adjust the positioning conditions of the plate 12, even after it has been assembled, in order to improve and/or modify its capacity of concentrating the radiant energy.

Furthermore, clamping by means of the screws 15 allows to prevent unwanted lateral displacements of the plates 12 with respect to the supporting wall 11, due for example to mechanical stresses produced by the wind or other atmospheric agents. This ensures an optimum disposition of the plates 12 so as to achieve an effective exposure thereof to the radiant energy.

Figure 4:
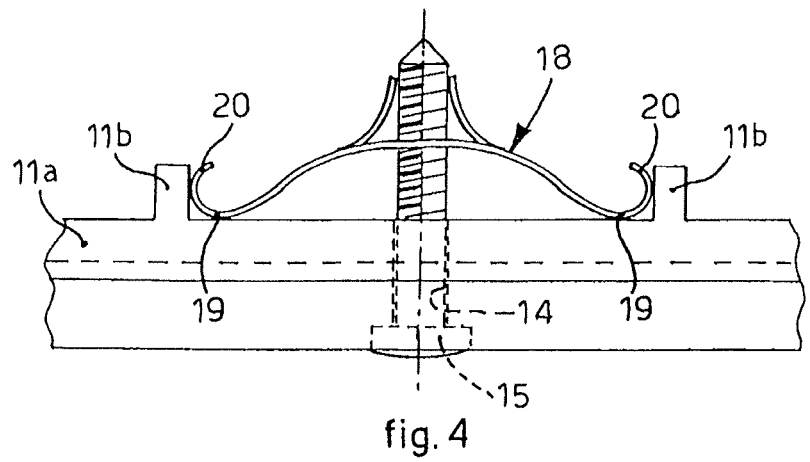
FIG. 4 is a schematic lateral view of a detail of a variant of the support structure in FIG. 1.

According to a variant shown in FIG. 4, the seating where the elastic elements 18 operate, that is, the internal portion of the edge 11a of the supporting wall 11, is provide with ridges 11b made in a piece and disposed substantially specular with respect to each hole 14. The ridges 11b are suitable to cooperate with the clamping portions 20 of the elastic elements 18, so as to condition the widening thereof during the step when they are adjusted by the screws 15.

This allows to make the elastic elements 18a rigid in coordination with the screwing of the screws 15 and to thus guarantee a more effective clamping action.

Figure 5:
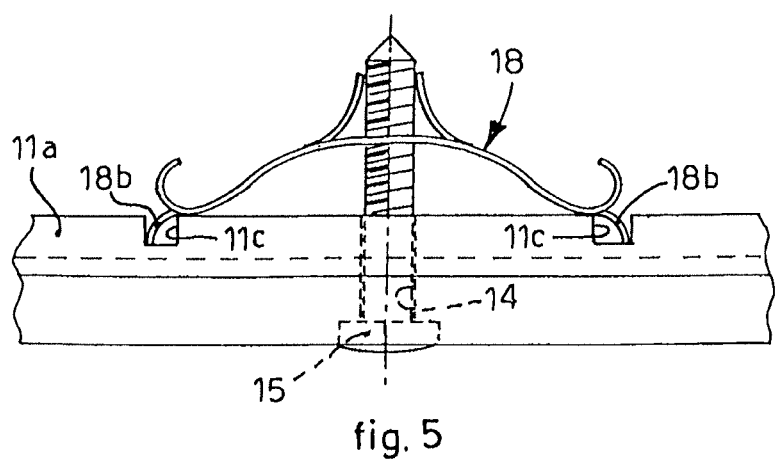
FIG. 5 is a schematic lateral view of a detail of another variant of the support structure in FIG. 1.
Figure 5A:
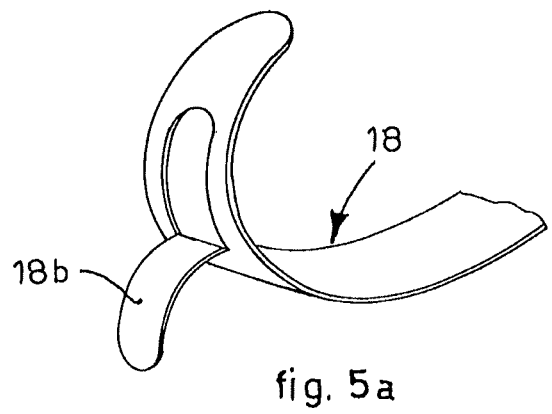
FIG. 5A is a perspective view of the detail in FIG. 5.

According to another variant, shown in FIGS. 5 and 5A, the seating where the elastic elements 18 operate is provided with hollows 18c, disposed substantially specular with respect to each hole 14, and suitable to cooperate with corresponding clamping tongues 18b made in each end 18a of the elastic elements 18.

The tongues 18b are bent downward with respect to the ends 18a so as to be inserted into a corresponding hollow 11c and to condition the widening of the elastic element 18 during the step when it is adjusted by the screws 15. In this case too, the tongues 18b have the function of exerting a function of elastic clamping, that is, of stiffening the elastic elements 18a in coordination with the screwing of the screws 15.

This allows, as described before, to stiffen the elastic elements 18a in coordination with the screwing of the screws 15 and thus to guarantee a more effective clamping action.

It is clear that modifications and/or additions of parts may be made to the support structure 10 as described heretofore, without departing from the field and scope of the present invention.

For example, it comes within the field of the present invention to provide that the clamping element 13 comprises the screws 15 integrated therewith.

According to a variant the screws 15 and the relative elastic elements 18 are made in a single piece and are mounted on the clamping element 13 and on the edge 11a of the supporting wall 11 like normal screw anchors.

The support structure 10, the clamping elements 13, the screws 15 and the elastic elements can be made indifferently of metal, plastic or other material.

According to another variant the clamping element 13 comprises the screws 15 and the elastic elements 18 integrated with each other, so as to reduce the assembly steps to a minimum.

It also comes within the field of the present invention to provide that instead of the screws 15 cylindrical adjustment bodies are provided, provided on the outside with coupling notches for the elastic element 18.

It is also clear that, although the present invention has been described with reference to some specific examples, a person of skill in the art shall certainly be able to achieve many other equivalent forms of support structure, having the characteristics as set forth in the claims and hence all coming within the field of protection defined thereby.

The invention claimed is:

1. A support structure, comprising a supporting wall, advantageously with a substantially parabolic profile, for solar plants of the concentration type, and able to support at least a thin and flexible reflection plate, able to reflect the sun's rays in order to concentrate them in correspondence with collectors to exploit the solar energy, and comprising clamping elements movable with respect to the supporting wall, and able to clamp said at least one reflection plate in cooperation with said supporting wall, said support structure comprising adjustment means constrained to the clamping elements and able to cooperate with relative elastic means constrained to the supporting wall, said elastic means being disposed and conformed with respect to the supporting wall so as to exert an action of traction on the adjustment means and on the clamping elements, so as to exert a desired action of deformation on the reflection plate, wherein the adjustment means comprise at least adjustment screw means cooperating with the elastic means which comprise a leaf spring elastic element, having opposite supporting ends with respect to the adjustment means, able to directly contact an internal portion of an edge of the supporting wall, wherein the internal portion of the supporting wall includes ridges or hollows to condition the widening of the leaf spring elastic element, and the opposite supporting ends directly contact the respective ridges or the respective hollows.

2. The support structure as in claim 1, wherein the leaf spring elastic element has sliding means at its supporting ends.

3. The support structure as in claim 1, wherein the clamping elements and the adjustment screw means are made in a single piece.

4. The support structure as in claim 1, wherein the adjustment means and the leaf spring elastic element are made in a single piece.

5. The support structure as in claim 1, wherein the clamping elements, the adjustment screw means and the leaf spring elastic element are made in a single piece.

6. The support structure as in claim 1, wherein the supporting wall includes the hollow, and the leaf spring elastic element and the hollow are configured to allow the leaf spring elastic element to stiffen.

7. The support structure as in claim 1, wherein the supporting wall includes the hollow, and the leaf spring elastic element comprises a tongue that can be inserted into the hollow.

8. A method to mount, on a support structure comprising a supporting wall, advantageously with a substantially parabolic profile, for solar plants of the concentration type, at least a thin and flexible reflection plate, able to reflect the sun's rays in order to concentrate them in correspondence with collectors to exploit the solar energy, and comprising clamping elements movable with respect to the supporting wall, and able to clamp said at least one reflection plate in cooperation with said supporting wall, wherein an internal portion includes ridges or hollows, the method comprising:

at least a step in which, by means of adjustment screw means constrained to the clamping elements and able to cooperate with relative leaf spring elastic element constrained to the supporting wall, placing and conforming said leaf spring elastic element with respect to the supporting wall, said leaf spring elastic element having opposite supporting ends with respect to the adjustment screw means;

placing the opposite supporting ends to directly contact the respective ridges or the respective hollows, and the opposite supporting ends also to directly contact the internal portion of an edge of the supporting wall, so as to exert an action of traction toward an inside on the adjustment screw means and on the clamping elements; and exerting a compression on the reflection plate so as to determine an action of deformation so as to conform the reflection plate substantially to a desired parabolic curve.

\* \* \* \* \*